United States Patent Office 2,957,880
Patented Oct. 25, 1960

2,957,880
PROCESS FOR THE CONVERSION OF STEREOISOMERS

Rudolf Rometsch, Riehen, Switzerland, assignor to Ciba Pharmaceutical Products Inc., Summit, N.J.

No Drawing. Continuation of application Ser. No. 476,846, Dec. 21, 1954, now Patent No. 2,838,519, dated June 10, 1958. This application Jan. 22, 1958, Ser. No. 710,406

Claims priority, application Switzerland Dec. 23, 1953

6 Claims. (Cl. 260—294)

This invention relates to the conversion of stereoisomers, and to new stereoisomers.

The manufacture of α-aryl-α-piperidyl-(2)-acetic acids and their functional acid derivatives such as esters and amides and also their functional conversion are known (cf. for example U.S. Patent No. 2,507,631, filed March 9, 1945 by Max Hartmann et al). The esters, especially the α-phenyl-α-piperidyl-(2)-acetic acid methyl ester of the formula

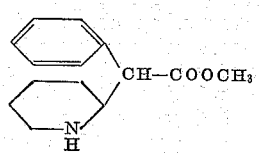

are distinguished by a mild stimulating effect on the central nervous system and can be used in states of fatigability, depression and exhaustion for instance in convalescence, or combined with antihistaminics, for example with benzyldimethylaminoethyl-aminopyridine, to counteract allergies.

The present invention is based on the observation that the α-aryl-α-piperidyl-(2)-acetic acids obtained by synthesis, and also their functional acid derivatives, can be resolved into two racemates. As a result it was discovered that in the case of the ester racemates it is only one of the two racemates which possesses the above specified therapeutic properties, whereas the other is practically inactive. Moreover, it was possible to obtain the two optically active antipodes of the pharmacologically active racemates.

The pharmacologically active ester-racemates and their optically active antipodes, as also the corresponding racemates and antipodes of the acids and acid derivatives, are hereinafter designated by the letter "b," and generically referred to as the b-stereoisomeric form, $b_1$ representing the pharmacologically active ester-antipode and $b_2$ the less active ester-antipode or the corresponding acids or acid derivative. The other racemates are called a-racemates and the corresponding antipodes are called a-antipodes, or more exactly $a_1$- and $a_2$-antipodes, and these forms are generically referred to as the a-stereoisomeric form.

The $b_1$ antipode of α-phenyl-α-piperidyl-(2)-acetic acid methyl ester hydrochloride is 5 times as active as the $b_2$ antipode.

A further feature of the present invention comprises a process for the conversion of the a-racemates or a-antipodes into the racemates or antipodes of the b-series which are of value as medicaments, as described above, or for the manufacture of such medicaments. This process consists in that the a-racemates or a-antipodes of α-aryl-α-piperidyl-(2)-acetic acids or their functional derivatives are treated with alkaline agents, preferably at an elevated temperature, e.g. 100° C. to 120° C., if desired the b-racemates or b-antipodes isolated from the product which results and further, if desired, before or after the isolation, the free or functionally converted carboxyl group subjected to conversion.

As starting materials there can be used pure a-racemates, a-antipodes or a racemate mixture of α-aryl-α-piperidyl-(2)-acetic acids or of their functional acid derivatives such as esters, especially of low alkanols, primarily methanol, or also amides. As the aryl residue the phenyl residue is of particular importance and this may be substituted, for example by a methoxy or methylene dioxy group. It is preferable to use the a-racemates or $a_1$-antipodes of α-phenyl-α-piperidyl-(2)-acetic acid or its functional derivatives. As alkaline agents there can be used for example alkali or alkaline earth hydroxides or alcoholates or strong organic bases, as for example trimethyl-benzyl-ammonium hydroxide, which are preferably used at elevated temperature.

Starting from a-racemates or racemate mixtures, mixtures of a- and b-racemates are obtained. However, if a-antipodes are used, optically active products are obtained instead of the expected racemates, in that from $a_1$-antipodes $b_1$-antipodes of opposite rotation are formed and from the $a_2$-antipodes $b_2$-antipodes are obtained analogously. This shows that, contrary to expectation the rearrangement in this process takes place at only one of the two asymmetrical carbon atoms.

The racemate mixtures to be used as starting materials can be made, for example, by the process of the aforementioned U.S. Patent No. 2,507,631, filed March 9, 1945 by Max Hartmann et al. The a-antipodes can be obtained from the a-racemates by means of optically active tartaric acid by the usual methods.

The racemates and antipodes of the α-aryl-α-piperidyl-(2)-acetic acids or of their derivatives which are produced as products of the present process, especially the b-racemate and the $b_1$-antipode of α-phenyl-α-piperidyl-(2)-acetic acid methyl ester, can be used as medicaments, as described above, or as intermediate products therefor. The α-aryl-α-piperidyl-(2)-acetic acids and the other functional derivatives can be converted into the therapeutically useful esters. The present invention also extends to pharmaceutical preparations which contain in admixture with a carrier material suitable for therapeutic application, e.g. enteral or parenteral, preferably oral, administration of the racemates of an α-aryl-α-piperidyl-(2)-acetic acid ester only the b-racemate. It also comprises such preparations as contain a $b_1$-antipode. In these preparations the content of b-racemate or $b_1$-antipode per unit dose advantageously amounts to at least 1 mg. and at most 50 mg. As carrier materials such substances are concerned as do not react with the new compounds, as for example water, gelatin, lactose, starch, magnesuim stearate, talc, vegetable oils, benzyl alcohols, gum, polyalkyline glycols, petroleum jelly cholesterol or other known medicament carriers. The pharmaceutical preparations can, for example, be made up as tablets, dragees, salves, creams or in liquid form as solutions, suspensions or emulsions. They may, if desired, be sterilized and/or may contain auxiliary substances, such as preserving, stabilizing, wetting or emulsifying agents or salts which have the effect of varying the osmotic pressure or also buffer substances. They may also contain other substances of therapeutic value e.g. antihistaminics, such as benzyl-dimethylaminoethyl-amino-pyridine. These pharmaceutical preparations are produced by the conventional methods.

This is a continuation of my copending application Serial No. 476,846, filed December 21, 1954, now Patent No. 2,838,519.

The following examples illustrate the invention, the relation between part by weight and part by volume being the same as that between the gram and the cubic centimeter:

EXAMPLE 1

50 parts by weight of α-phenyl-α-piperidyl-(2)-acetic acid methyl ester hydrochloride, having a content of about 20 percent of b-racemate are dissolved in a little water, the solution covered with a layer of ether and 1.5 equivalents of aqueous 50 percent caustic potash solution added thereto. After the separation of the ether layer, the aqueous layer is extracted twice with ether and the combined ether solutions then evaporated to dryness. The residue amounts to 43 parts by weight. It is mixed with 50 parts by weight of potassium hydroxide, dissolved in 100 parts by volume of water, and the mixture boiled for 4 hours under reflux. On cooling, the reaction solution separates into two layers. The upper consists of a mixture of the potassium salts of the two stereoisomeric α-phenyl-α-piperidyl-(2)-acetic acid racemates, which mixture becomes solid after a few hours standing at 20° C. It is diluted with 110 parts by volume of water and brought to pH, 6.0 with 137 parts by volume of 2 N-sulfuric acid. The b-racemate of α-phenyl-α-piperidyl-(2)-acetic acid is precipitated while the a-racemate remains in solution. The precipitate is granular and well suited to filtration with suction. After several hours drying at 100° C. it weighs 24.2 parts by weight and consists of pure b-racemate of α-phenyl-α-piperidyl-(2)-acetic acid.

Re-esterification to b-racemates of α-phenyl-α-piperidyl-(2)-acetic acid esters and the formation of the corresponding hydrochlorides can be carried out by conventional methods.

As an example, the methyl ester hydrochloride is obtained by suspension of 1 part by weight of the b-racemate of α-phenyl-α-piperidyl-(2)-acetic acid in 3.5 parts by volume of methanol and by boiling for 2 hours under reflux with passage of dry hydrogen chloride gas. After the cooling of the solution, the b-racemate of α-phenyl-α-piperidyl-(2)-acetic acid methyl ester hydrochloride crystallises in fine prisms of melting point 208–209° C. The solubility at 20° C. in methanol is 164 grams per liter.

The b-racemate of the butyl ester hydrochloride is obtained in an analogous manner by stirring for 2 hours one part by weight of b-racemate of α-phenyl-α-piperidyl-(2)-acetic acid in 4 parts by volume of n-butanol in a stream of hydrogen chloride at 80° C. The b-racemate of the α-phenyl-α-piperidyl-(2)-acetic acid butyl ester hydrochloride, which crystallizes on cooling, can be recrystallized from acetone and melts at 165° C.

The α-phenyl-α-piperidyl-(2)-acetic acid methyl ester hydrochloride, used as starting material, can be obtained in the following manner:

75 parts by weight of α-phenyl-α-pyridyl-(2)-acetamide, are hydrogenated in a solution of glacial acetic acid in the presence of 1 part by weight of platinum oxide (according to Adams) at 40° C. 24.000 parts by volume of hydrogen (0° and 760 mm.) are absorbed in 26 hours. The acetic acid is evaporated and, after the addition of water, the piperidine base is precipitated by means of caustic soda. Recrystallized from ethyl acetate and dried for 12 hours in vacuo at 70° C. and 12 hours at 120° C., the amide melts at 173° C. Yield 70 parts by weight.

20 parts by weight of α-phenyl-α-piperidyl-(2)-acetamide are refluxed with 100 parts by volume of concentrated hydrochloric acid for 9 hours. Upon cooling the crystalline hydrochloride of the α-phenyl-α-piperidyl-(2)-acetic acid precipitates. It is recrystallized from methyl alcohol and has a decomposition point of 248° C.

1 part by weight of this hydrochloride is suspended in 3.5 parts by volume of methanol and boiled for 2 hours under reflux with passage of dry hydrogen chloride gas. After the cooling of the solution the racemate mixture of the α-phenyl-α-piperidyl-(2)-acetic acid methyl ester hydrochloride crystallizes. The melting point of the mixture varies between 200°–206° C.

EXAMPLE 2

116 parts by weight of the a-racemate of α-phenyl-α-piperidyl-(2)-acetic acid hydrochloride are boiled under reflux for 5 hours with 2000 parts by weight of potassium hydroxide dissolved in 2000 parts by volume of water. The whole reaction solution is then neutralized with hydrochloric acid to pH=6.0 with simultaneous dilution with water to 10.000 parts by volume. A granular precipitate is deposited which consists of a mixture of potassium chloride and the b-racemate of α-phenyl-α-piperidyl-(2)-acetic acid. The potassium chloride can be removed by washing with water. In this manner 69 parts by weight of b-racemate of α-phenyl-α-piperidyl-(2)-acetic acid are obtained, which can be esterified by the method described in Example 1. It is also possible, however, to effect the esterification using the mixture of potassium chloride and b-racemate.

The a-racemate of α-phenyl-α-piperidyl-(2)-acetic acid hydrochloride, which is used as starting material, can be obtained, for example, as follows:

50 parts by weight of α-phenyl-α-piperidyl-(2)-acetic acid methyl esterhydrochloride with a content of about 20 percent of b-racemate are treated with caustic potash solution as described in Example 1. The separated mixture of the potassium salts of the stereoisomeric α-phenyl-α-piperidyl-(2)-acetic acid racemates is diluted with 110 parts by volume of water and brought to pH=6 with 137 parts by volume of 2 N-hydrochloric acid. The precipitated b-racemate is filtered with suction and the mother liquor evaporated to dryness. The residue is recrystallized from 6 N-hydrochloric acid. In this manner pure a-racemate of α-phenyl-α-piperidyl-(2)-acetic acid hydrochloride is obtained.

It can be esterified in the same manner as the b-racemate by boiling it in methanol with passage of hydrogen chloride gas. The resulting a-racemate of α-phenyl-α-piperidyl-(2)-acetic acid methyl ester hydrochloride has a melting point of 207–208° C. and its solubility at 20° C. in methanol is 234 grams per liter.

EXAMPLE 3

25 parts by weight of crude α-phenyl-α-piperidyl-(2)-acetamide, with a content of about 30 percent of b-racemate, are boiled for 10 hours under reflux with 25 parts by weight of potassium hydroxide dissolved in 50 parts by volume of water. After cooling, 23.5 parts by weight are deposited of a racemate mixture of α-phenyl-α-piperidyl-(2)-acetamide with an increased content of b-racemate, which mixture is filtered with suction, washed with a little cold water and hydrolyzed to α-phenyl-α-piperidyl-(2)-acetic acid by 6 hours' boiling with 47 parts by volume of 40 percent sulfuric acid. The hydrolysis solution is brought to pH=6.0 with caustic potash solution with simultaneous dilution with water to 400 parts by volume. 19 parts by weight are deposited of b-racemate of α-phenyl-α-piperidyl-(2)-acetic acid, which can be esterified as described in Example 1. The α-phenyl-α-piperidyl-(2)-acetamide is prepared as described in Example 1.

EXAMPLE 4

500 parts by weight of crude α-phenyl-α-piperidyl-(2)-acetamide with a content of a-racemate of 68 percent, are dissolved in 2000 parts by volume of absolute ethyl alcohol, the solution treated with dry hydrogen chloride gas and the whole allowed to stand for 2 hours at 5–10° C. 425 parts by weight of nearly pure a-racemate of α-phenyl-α-piperidyl-(2)-acetamide hydrochloride (solubility at 25° in absolute ethanol=4 grams per liter) crystallize out. This product is boiled under reflux for 16 hours with 425 parts by weight of potassium hydroxide dissolved in 850 parts by volume of water. The racemate mixture of α-phenyl-α-piperidyl-(2)-acetamide, which precipitates on cooling, together with the evaporation residue from the above obtained alcoholic mother liquor from the a-racemate and which consists of practically pure b-racemate of the hydrochloride of α-phenyl-α-piperidyl-(2)-acetamide (solubility at 25° in absolute ethanol=185 grams per liter) is hydrolyzed by boiling for 6 hours with 1300 parts by volume of 40 percent sulfuric acid. By dilution and neutralization of the hydrolysis solution to pH=6 a precipitate is obtained of b-racemate of α-phenyl-α-piperidyl-(2)-acetic acid which is isolated as described in Example 1. Yield 382 parts by weight.

The α-phenyl-α-piperidyl-(2)-acetamide used as starting material is obtained by the procedure described in Example 1.

EXAMPLE 5

40 parts by weight of the crude α-phenyl-α-piperidyl-(2)-acetamide as used in Example 4 are stirred for 2 hours at 100° C. with 200 parts by volume of a 40 percent solution of trimethylbenzyl ammonium hydroxide in water. Thereupon, with cooling, the whole is brought to pH=9.9 with 6 N-hydrochloric acid and the solution exhaustively extracted with ethylene chloride. The ethylene chloride residue is hydrolyzed with 40 percent sulfuric acid in a manner analogous to that described in Example 4 and the hydrolysis solution also worked up in an analogous manner to that described in the said example. In this manner 19.9 parts by weight of b-racemate of α-phenyl-α-piperidyl-(2)- acetic acid are obtained.

EXAMPLE 6

11 parts by weight of the laevo-rotary a-isomer of α-phenyl-α-piperidyl-(2)-acetamide-herein before called $a_1$-antipode-, having a specific rotation $[\alpha]_D^{22}=-68°$ (as 1 percent solution in 60 percent ethanol) and a solubility in ethyl acetate at 25° of 20.5 grams per liter—melting points 162°—163° C.—are refluxed for 6 hours with 12 parts of potassium hydroxide, dissolved in 12 parts by volume of water. After cooling, 10.5 parts by weight of a mixture of $a_1$-antipode and $b_1$-antipode of the α-phenyl-α-piperidyl-(2)-acetamide precipitate. The precitate is suction-filtered, washed with a small amount of cold water, and dried for half an hour at 70° C. under reduced pressure. The material then has a specific rotation $[\alpha]_D^{22}=+41°$ (as 1 percent solution in 60 percent ethanol). By recrystallization from 350 parts by volume of ethyl acetate there is obtained a first main fraction of 4.9 parts by weight of $b_1$-antipode, having a specific rotation $[\alpha]_D^{22}=+65°$ (as 1 percent solution in 60 percent ethanol) and a solubility in ethyl acetate at 25°= 8.7 grams per liter. By systematic fractional crystallization it is possible to regenerate from the mother liquors further quantities of $b_1$-antipode, in addition to 2.5 parts by weight of the originally used $a_1$-antipode. Yet it is preferable to subject the combined mother liquor products of the first $b_1$-antipode crystallization to a further alkaline treatment, whereupon a main fraction of pure $b_1$-antipode can be separated, again by a single crystallization operation from ethyl acetate. This procedure is repeated until practically the entire quantity of $a_1$-antipode is converted into the $b_1$-antipode of the α-phenyl-α-piperidyl-(2)-acetamide (melting point=170°–171°C.).

From 4.5 parts by weight of this $b_1$-antipode of the α-phenyl-α-piperidyl-(2)-acetamide there are obtained by refluxing for 6 hours with 14.5 parts by volume of 6 N-hydrochloric acid and subsequent recrystallization at 20° C. 5.0 parts by weight of the $b_1$-antipode of α-phenyl-α-piperidyl-(2)-acetic acid hydrochloride having a specific rotation $[\alpha]_D^{22}=+63°$ (as 1 percent solution in water) and a melting point 207°—208° C.

4.5 parts by weight of this substance are dissolved in 2 parts by volume of methanol and refluxed for 2 hours while introducing dry hydrogen chloride gas. On cooling, 3.8 parts by weight of the $b_1$-antipode of α-phenyl-α-piperidyl-(2)-acetic acid-methyl ester-hydrochloride having a specific rotation $[\alpha]_D^{22}=+89°$ (as 1 percent solution in methanol) and melting point 205°–206° C. are obtained.

The $a_1$-antipode of α-phenyl-α-piperidyl-(2)-acetamide used as starting material is obtained in the following manner:

109 parts by weight of a-racemate of α-phenyl-α-piperidyl-(2)-acetamide (melting point 167°–168° C.) are dissolved in 2500 parts by volume of 96 percent ethanol and the boiling solution mixed with a boiling solution of 75 parts by weight of l-tartaric acid in 2500 parts by volume of 96 percent ethanol. The mixture is allowed to stand at 20° C. for 15 hours during which 112 parts by weight of the acid α-phenyl-α-piperidyl-(2)-acetamide tartrate crystallize; this salt contains the $a_1$-antipode in enriched form owing to its higher speed of crystallization. The acid tartrate is dissolved in 500 parts by volume of water, the amide is precipitated with 1.1 equivalents of 10 N-caustic soda solution; the preparation and crystallization of the salt by the same procedure is repeated twice with correspondingly smaller amounts of l-tartaric acid and solvent. The crude $a_1$-antipode is crystallized from ethyl acetate to obtain 35 parts by weight of the pure $a_1$-antipode of α-phenyl-α-piperidyl-(2)-acetamide used for the rearrangement reaction.

The $a_2$-antipode of α-phenyl-α-piperidyl-(2)-acetamide can be obtained from the a-racemate by the same procedure using a d-tartaric acid. This antipode can be converted into the $b_2$-antipode of α-phenyl-α-piperidyl-(2)-acetamide and subsequently into the $b_2$-antipode of α-phenyl-α-piperidyl-(2)acetic acid methyl ester hydrochloride, having a specific rotation $[\alpha]_D^{22}=89°$ C. (as 1 percent solution in methanol).

From the b-racemates and b-antipodes obtained as described in these examples pharmaceutical preparations can be obtained in the usual manner, e.g.

(A) Tablets

One tablet contains

| | Mg. |
|---|---|
| b-Racemate of α-phenyl-α-piperidyl-(2)-acetic acid methylester hydrochloride | 10.0 |
| Lactose | 40.0 |
| Calcium triphosphate | 35.0 |
| Gelatine | 1.0 |
| Wheat starch | 33.0 |
| Arrowroot | 15.0 |
| Magnesium stearate | 0.4 |
| Talcum | 5.6 |
| | 140.0 |

To prepare the tablets, the above mentioned b-racemate, lactose and calcium triphosphate are mixed together. Gelatine is dissolved in water and part of the wheat starch is pasted with the solution. The racemate mixture is treated with the paste, the remaining wheat starch is added and the product granulated and dried. A lubricant is added and the granulate pressed into tablets.

(B) Ampoule solution

One ampoule contains 20 mg. b-racemate of α-phenyl-α-piperidyl-(2)-acetic acid methylester hydrochloride; 5 mg. calcium levulinate and distilled water to make up 1 cc.

*Preparation.*—The b-racemate and calcium levulinate are dissolved in the required quantity of distilled water, the solution is filtered under sterile conditions, and the ampoules filled, aseptic precautions being taken.

(C) Dry ampoules

One ampoule contains 20 mg. of b-racemate of α-phenyl-α-piperidyl-(2)-acetic acid methylester hydrochloride, and 5 mg. of calcium levulinate.

*Preparation.*—A solution of the b-racemate prepared as indicated under B is filtered under sterile conditions, filled into ampoules, and subjected to freeze drying, aseptic precautions being taken. The dried ampoules are sealed in the usual manner.

In the same way, preparations with the $b_1$-antipode of α-phenyl-α-piperidyl-(2)-actic acid methyl ester hydrochloride can be made.

What is claimed is:

1. The $b_1$-antipode form of α-phenyl-α-piperidyl-(2)-acetic acid lower alkyl ester free from the $b_2$-antipode form.
2. The $b_1$-antipode form of α-phenyl-α-piperidyl-(2)-acetic acid methyl ester free from the $b_2$-antipode form.
3. The $b_1$-antipode form of α-phenyl-α-piperidyl-(2)-acetic acid methyl ester hydrochloride free from the $b_2$-antipode form.
4. The $b_1$-antipode form of α-phenyl-α-piperidyl-(2)-acetic acid free from the $b_2$-antipode form.
5. The $b_1$-antipode form of α-phenyl-α-piperidyl-(2)-acetic acid amide free from the $b_2$-antipode form.
6. The $b_1$-antipode form of α-phenyl-α-piperidyl-(2)-acetic acid hydrocloride free from the $b_2$-antipode form.

References Cited in the file of this patent

UNITED STATES PATENTS

| | | |
|---|---|---|
| 2,507,631 | Hartmann et al. | May 16, 1950 |
| 2,774,789 | Tullar | Dec. 18, 1956 |
| 2,838,519 | Rometsch | June 10, 1958 |

OTHER REFERENCES

Crook et al.: J. Am. Chem. Soc., vol. 52, pp. 4006–4010 (1930).

Fieser and Fieser: Org. Chem., 3rd ed., pp. 264–267 (1956).

UNITED STATES PATENT OFFICE
CERTIFICATION OF CORRECTION

Patent No. 2,957,880                          October 25, 1960

Rudolf Rometsch

It is hereby certified that error appears in the above numbered patent requiring correction and that the said Letters Patent should read as corrected below.

Column 6, line 1, for "2", first occurrence, read -- 12 --; line 32, after "using" strike out "a"; line 35, for "(2)acetic" read -- (2)-acetic --; column 7, line 11, for "actic" read -- acetic --.

Signed and sealed this 6th day of June 1961.

(SEAL)
Attest:

ERNEST W. SWIDER
Attesting Officer

DAVID L. LADD
                                              Commissioner of Patents